United States Patent [19]
Sirven

[11] Patent Number: 4,749,068
[45] Date of Patent: Jun. 7, 1988

[54] SHOCK ABSORBER FOR THE SUSPENSION OF A MOTOR VEHICLE

[76] Inventor: Jacques Sirven, 34, Rue de l'Orangerie, 78000 Versailles, France

[21] Appl. No.: 809,667

[22] Filed: Dec. 16, 1985

[30] Foreign Application Priority Data

Dec. 20, 1984 [FR] France ................. 84 19580

[51] Int. Cl.[4] ................. F16F 9/06; F16F 9/34; F16F 5/00; F16F 9/14
[52] U.S. Cl. ................. 188/269; 188/322.15; 267/64.13; 267/64.15
[58] Field of Search ............ 188/269, 322.19, 322.21, 188/322.14, 322.18, 292, 322.15, 322.22; 267/64.15, 64.17, 64.18; 280/708

[56] References Cited

U.S. PATENT DOCUMENTS 2,685,888 8/1954 Strauss .

FOREIGN PATENT DOCUMENTS

| 0474632 | 7/1946 | Belgium . |
| 0003458 | 1/1979 | European Pat. Off. . |
| 0003290 | 8/1979 | European Pat. Off. . |
| 1678593 | 6/1954 | Fed. Rep. of Germany . |
| 2139942 | 11/1972 | Fed. Rep. of Germany . |
| 0556292 | 7/1923 | France . |
| 1364558 | 5/1964 | France . |
| 0085605 | 4/1965 | France . |
| 2287627 | 10/1974 | France . |
| 2278996 | 2/1976 | France . |
| 0192645 | 11/1982 | Japan ................. 188/279 |
| 2064712 | 6/1981 | United Kingdom . |

Primary Examiner—Andres Kashnikow
Assistant Examiner—Robert J. Oberleitner
Attorney, Agent, or Firm—Beveridge, DeGrandi & Weilacher

[57] ABSTRACT

A shock absorber for the suspension of a motor vehicle includes a cylinder containing hydraulic liquid, and a piston attached to a rod wherein the piston defines first and second chambers within the cylinder. The second chamber contains the rod. A first flow restrictor permits fluid flow communication between the first chamber and a reservoir for hydraulic liquid. A control valve, movable from a closed position to an open position during a rapid compression movement of the piston, is provided for controlling fluid flow between the first and second chambers. A biasing spring and the pressure of a reference fluid contained within a reference chamber tend to bias the control valve closed while the pressure of the hydraulic fluid in the first chamber tends to bias the control valve open. A second flow restrictor is positioned in the flow path of the hydraulic liquid that exits from the first chamber and restricts the flow of the liquid when a rapid compression movement of the piston causes the control valve to open.

23 Claims, 5 Drawing Sheets

SHOCK ABSORBER FOR THE SUSPENSION OF A MOTOR VEHICLE

The present invention relates to a shock absorber for the suspension of a motor vehicle, of the type in which the damping force decreases when the speed of the compressive movement of the shock absorber rod exceeds a predetermined limit value.

A description has already been given in French published Patent Application No. 2,287,627 of a hydraulic shock absorber provided with a controlled valve which, when it opens, establishes communication between the two shock absorber chambers defined inside the cylinder by the piston actuated by its rod. The operating pressure of the control valve is obtained by braking the flow, towards a hydraulic-liquid reservoir, of the excess liquid resulting from a reduction in the effective volume of the cylinder following penetration of the piston rod into one of the chambers of the said cylinder. When the compression speed of the piston rod exceeds a limit value, the differential pressure acting on the two surfaces of the control valve increases and causes, above a predetermined limit value, opening of the control valve, thereby giving rise to a rapid reduction in the damping force.

In an embodiment also described in this French patent application, the shock absorber may also be mounted by means of an elastic part. As a result of this improvement, when the increase, per unit of time, of the speed of movement of the rod is very considerable, the elastic part is first of all compressed, which leads to an increase in the volume of the immersed parts inside the cylinder, thereby giving rise to the operation of the control valve as described above, before the damping force reaches its maximum value.

In this French patent application, the control valve is subjected, in addition, to the action of a reference pressure produced by a gas contained inside a reference chamber which may advantageously be connected to the gas-filled part of the hydraulic-liquid reservoir so as to achieve a pressure equilibrium making it possible to eliminate variations in operation due to heat expansion.

European Patent Application No. 0,003,290 also describes a variation of such a shock absorber comprising a single tube in contrast to the two tubes required in the abovementioned French Patent Application. The control valve is thus mounted inside the piston, the control valve being operated directly by the pressure prevailing inside the first chamber of the shock absorber cylinder, thereby simplifying the structure of the shock absorber.

In all cases, owing to the existence of the hydraulically operated control valve, a sharp decrease in the damping force is obtained when the plunging speed of the rod exceeds a limit compression value.

In practice, it can be noted that these shock absorbers in fact enable a damping force to be obtained which decreases to an almost zero value when the compression speed of the rod is considerable. However, it may be necessary, in certain applications, for the damping force not to decrease to a zero value when the plunging speed of the rod increases and exceeds a limit value. It may also be necessary, in the case of very high compression speeds of the rod, for the damping force to increase slightly after reaching a minimum value. Thus, better traction is obtained for the vehicle equipped with the shock absorber. on surfaces where there is a periodic succession of small undulations as found, for example, on certain fast roads or highways made of concrete.

The object of the present invention, therefore, is to improve the shock absorbers described in the prior art, comprising a control valve operated so as to bring about a reduction in the damping force when the plunging speed of the rod during compression exceeds a given limit value. The object of the invention is to provide additional means for these shock absorbers so that the damping force does not decrease to a zero value, but, on the contrary, remains at a given value equal, for example, to a third or a quarter of the maximum value reached for the limit plunging speed of the rod during compression where by the damping force decreases.

The shock absorber for the suspension of a motor vehicle according to the invention is of the type comprising a cylinder containing a hydraulic liquid, a piston actuated by a rod defining inside the cylinder a first chamber and a second chamber, the said second chamber containing the rod, a hydraulic-liquid reservoir being able to communicate with the first chamber via a restriction. The shock absorber comprises a control valve capable of opening and shutting-off a flow of liquid between the first and second chamber. The control valve is subjected, on the one hand, to the action of the pressure of the hydraulic liquid inside the first chamber, tending to open the valve, and, on the other hand, to the action of a return spring and the substantially constant pressure of a reference gas contained inside a reference chamber, one wall of which is movable with the control valve. According to the invention, the shock absorber comprises, in addition, an additional restriction placed in the flow path of the hydraulic liquid leaving the first chamber when a rapid compressive movement of the rod occurs, causing the opening of the control valve.

This additional restriction may also be placed downstream of the seat of the control valve with respect to the flow of the hydraulic liquid during a compresssive movement. In a variation, the additional restriction may also be placed between the first chamber and the seat of the control valve. In another variation, the additional restriction may also be arranged in the seat itself of the control valve.

In a preferred embodiment, the additional restriction is achieved in the form of a flap valve consisting of a thin annular disk possessing a certain degree of flexibility and made preferably of sprung steel, for example in the form of a metal leaf. Such a thin annular disk is provided with a central bore and simply rests in one direction by means of its external periphery and in the other direction by the internal periphery of the central bore. As a result of such a construction, the flap valve is thus able to operate in both directions since the annular disk is not built-in in any way. During a compressive movement of the rod, the flap valve acts as a restriction making it possible, after opening of the control valve and by throttling the flow of the hydraulic liquid, to keep the damping force at a non-zero value, whatever the plunging speed of the rod. When there is an opposite, expanding movement of the rod, the flap valve operates in the other direction, thereby making it possible to achieve a damping effect in the conventional manner.

In a preferred embodiment, the hydraulic-liquid reservoir contains a gas which is separated from the liquid by a flexible membrane or a movable piston, and the reservoir is linked to the reference chamber so as to eliminate fluctuations due to heat expansion. The pressure prevailing both inside the reservoir and inside the reference chamber is preferably greater than atmospheric pressure.

In another preferred embodiment, the shock absorber comprises, in addition, an elastic block, made for example of elastomer, by means of which the shock absorber is fixed. The elastic block is fixed inside the shock absorber so as to give rise to a reduction in the effective volume of the shock absorber, causing opening of the control valve when there is a sudden compressive movement. As a result of this arrangement, the variations in the damping force are effective in a less sudden manner than in the case where there is no such elastic block.

According to a first variation, the shock absorber of the invention comprises a cylindrical casing surrounding the cylinder inside which the piston moves and defining with the latter an annular chamber able to link the first chamber in the cylinder to the second chamber. The control valve is mounted in an intermediate space provided in a fixed closing part of the cylinder and having a passage linking the annular chamber to the reservoir by means of a restriction. The abovementioned intermediate space is linked to the second chamber by means of the annular chamber.

The flap valve according to the present invention separates the intermediate space into two parts. A first part is delimited by a flexible membrane integral with the control valve. A second part comprises the seat of the control valve.

In addition, a deflection member is mounted in the first part of the intermediate space in order to channel the flow of hydraulic fluid when the control valve is opened by reducing the effect of the dynamic pressure on the membrane. In fact, when the control valve is opened, a large amount of liquid, after passing through the valve, flows from the first chamber towards the second chamber and the reservoir. If no deflector member is provided, the appearance of turbulent flow is noted, giving rise to local variations of pressure inside the intermediate space. These variations risk disturbing the operation of the shock absorber by modifying the opening characteristics of the control valve operated by the pressure exerted on the flexible membrane. With the deflector member advocated according to the present invention, this type of drawback can be avoided. The pressure exerted on the membrane is thus, in fact, a static pressure prevailing in a zone of non-turbulent flow.

The deflector member advantageously consists of an annular disk provided with holes in the vicinity of its external periphery and radially occupying the entire intermediate space. As a result of this arrangement, it is ensured that the pressure exerted on the membrane is the static pressure prevailing in the flow when the control valve is opened.

According to a preferred arrangement, the deflector member is fixed by means of its internal periphery to the closing piece inside which the control valve is mounted. The deflector member has a central sleeve providing guidance for the control valve during its opening movements.

According to a second variation of the invention, the shock absorber comprises a single tube forming the main cylinder. The control valve is mounted inside the piston itself consisting of a hollow part. The shutter according to the invention is mounted in the vicinity of one of the ends of the piston.

The piston comprises advantageously a restriction allowing hydraulic liquid to flow from the second chamber towards the first chamber when the rod performs an expanding movement.

The invention will be better understood by examining a few embodiments described by way of examples which are in no way limiting and illustrated by the attached drawings in which:

FIG. 3 is a section along the line III—III of FIG. 1;

Figure 1:
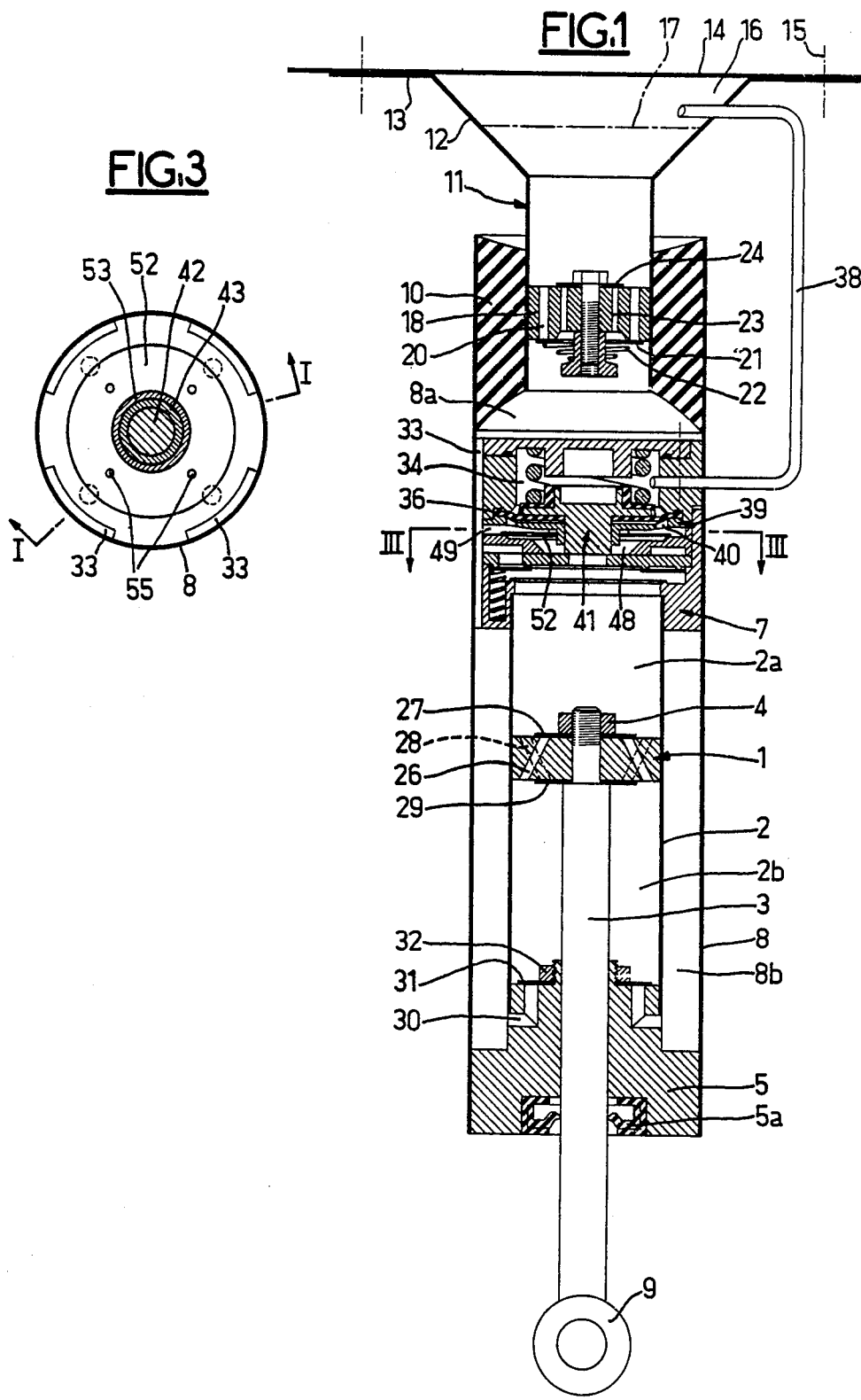
FIG. 1 is a schematic sectional view of a first embodiment of a shock absorber according to the invention with two concentric tubes.
Figure 2:
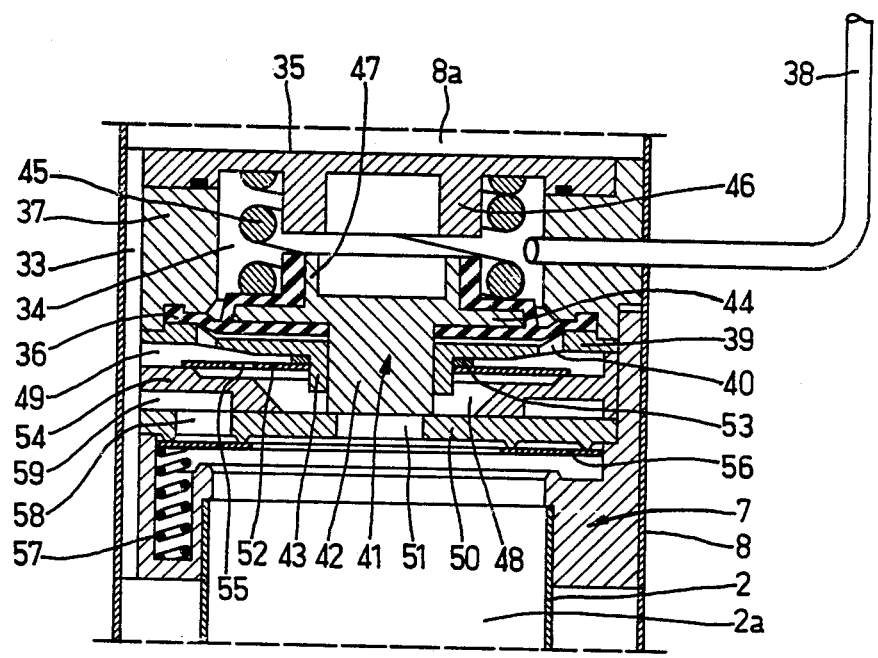
FIG. 2 is an enlarged view of the part shown in FIG. 1, comprising the control valve.

As shown in FIGS. 1 to 3, the shock absorber according to the invention comprises a piston 1 which slides inside a cylinder 2 and which defines inside the latter a first chamber 2a located at the top of the piston 1 and a second chamber 2b which encloses the rod 3 rigidly fixed to the piston 1, for example by means of a locking nut 4. The cylinder 2 is integral, at its lower end, with a closing part 5 having a central bore provided with a sealing ring 5a through which the rod 3 of the piston passes. At its upper end, the cylinder 2 is integral with an upper closing part 7.

An external cylindrical casing 8 concentric with the cylinder 2 serves as a housing for all the shock absorber components and is integral with the lower closing part 5 and with the upper closing part 7. A fastening device 9 enables the rod 3 to be rigidly fixed, for example to a wheel or to a suspension arm of a vehicle (not shown). The shock absorber operates normally with the rod arranged downwards as shown in FIG. 1.

The cylindrical external casing 8 is closed, at its upper part, by an elastic block 10, made of elastomer or of a similar material, which is integral with the internal wall of the casing 8 and which has a central bore inside which a hydraulic-liquid reservoir 11 is fixed, the upper part 12 of which widens out and has a flange 13 enabling it to be fixed to the body 14 of the motor vehicle by means of screws 15. Of course, this arrangement could be inverted, the reservoir 11 thus surrounding the casing 8, and the elastic block 10 thus being integral with the internal wall of the reservoir 11. The reservoir 11 encloses in its top part a gas 16, the level of the liquid being indicated by 17. The gas 16 may be in direct contact with the hydraulic liquid, as shown in FIG. 1, or may be separated from it by any suitable means such as a membrane or a floating piston.

A separating member 18 is fixed inside the reservoir 11 and has the purpose of separating the upper portion 8a of the casing 8 and the actual reservoir 11. The separating member 18 has substantially axial passages 20 which may be sealed off by an elastic washer 21 which acts as a nonreturn valve and is pushed upwards by a spring 22 so as to allow hydraulic liquid to flow from the reservoir 11 to the upper portion 8a of the casing 8. The separating member 18 has, moreover, substantially axial passages 23 cooperating with a nonreturn valve 24 possessing a given rigidity, so as to allow hydraulic fluid to flow in the opposite direction.

The nonreturn valve 21 is chosen so as to be flexible so that it provides only a weak resistance to the flow of liquid from the reservoir 11 to the upper portion 19. The rigidity of the nonreturn valve 24 is chosen so as to be greater in order to ensure operation of the shock absorber when the rod 3 performs a compressive movement, as will be seen below.

The piston 1 comprises passages 26 cooperating with a nonreturn valve 27 so as to allow a limited amount of hydraulic liquid to pass from the second chamber 2b to the first chamber 2a and prevent any flow in the opposite direction. The piston 1 also has passages 28 cooperating with a nonreturn valve 29 so as to allow a limited amount of hydraulic liquid to flow from the first chamber 2a to the second chamber 2b and prevent any flow in the opposite direction.

Passages 30 and a very flexible nonreturn valve 31 held by a nut 32 are provided in the lower part 5 so as to allow hydraulic liquid to flow from the annular chamber 8b to the second chamber 2b and prevent it in the other direction.

The upper closing part 7 consists of a certain number of stacked parts, the assembly being held together by means of the clamping screws. All of these parts have, when viewed from above, an identical profile, the section in FIG. 3 showing that the profile of the closing part 7, viewed from above, has passages 33 allowing hydraulic liquid to flow between the annular chamber 8b and the upper part 8a of the casing 8.

Reference is made in particular to the enlarged view shown in FIG. 2.

.A completely closed reference chamber 34 is defined inside the closing part 7 between an upper coverpiece 35 and a flexible membrane 36, the side walls of the chamber 34 being defined by an annular part 37. Inside the reference chamber 34, there is a gas at a pressure which remains substantially constant during operation of the shock absorber and is preferably greater than atmospheric pressure. A pipe 38 outside the shock absorber connects the reference chamber 34 to the upper portion 16 of the reservoir 11 so as to balance the pressures.

The membrane 36 is mounted so as to be clamped by means of its external periphery between the annular part 37 and a fixed deflector disk 39 provided with holes 40 in the vicinity of its external periphery. A control valve 41 is mounted inside the reference chamber 34. The control valve 41 has a cylindrical portion similar to a piston 42 which is able to slide inside a cylindrical guiding sleeve 43 which forms an integral part of the deflector disk 39. The cylindrical part 42 forming a piston is integral with a radial part 44 which fits into a slot provided inside a fold of the flexible membrane 36. A return spring 45 is also mounted inside the reference chamber 34 and bears, on the one hand, against the internal wall of the cover-piece 35 and, on the other hand, against the radial extension 44 of the valve 41, with interposition of the fold of the flexible membrane 36. In addition, the spring 45 is guided by two cylindrical protuberances 46 and 47 integral with the cover-piece 35 and the valve 41, respectively.

Under these conditions, it can be seen that the valve 41 which is guided by the fixed deflector member 39 is able to move axially inside the reference chamber 34, one wall of which is movable since it consists partly of the flexible membrane 36 and of the valve 41. The pressure of the gas located inside the reference chamber 34 as well as the compression spring 45 act on the valve 41 in its closing direction.

An intermediate space 48 is provided inside the closing part 7 and is delimited by the flexible membrane 36 which forms the upper movable wall of the space 48. This intermediate space communicates, by means of the radial passages 49, with the passages 33, i.e. on the one hand with the upper portion 8a and on the other hand with the annular chamber 8b of the casing 8. In addition the intermediate space 48 is delimited by an annular part 50 which has a central orifice 51 acting as a seat for the piston 42 of the control valve 41.

An additional flap valve 52 separates the intermediate space 48 into two parts. A first upper part is delimited by the flexible membrane 36 integral with the control valve 41. A second lower part is delimited by the annular part 50 comprising the seat 51 of the control valve 41. The flap valve 52 consists, in the embodiment shown in FIG. 1, of a thin annular disk, made for example of flexible spring steel, which has a central bore with a diameter corresponding to the external diameter of the guiding sleeve 43 of the deflector 39 (FIG. 3). The flap valve 52 is therefore mounted, by means of its central bore, surrounding the guiding sleeve 43 where it bears against a washer 53. By means of its external periphery, the flap valve 52 bears, in the other direction, against an annular bearing spacer 54 mounted between the part 50 and the deflector member 39. The spacer 54 defines, by means of the thickness of its periphery, the necessary distance between the part 50 and the deflector 39 in order to obtain the intermediate space 48.

The flap valve 52 may have, in addition, four holes 55 which can be seen in FIG. 3 and which have, for example, a diameter of the order of 1.5 to 2 mm.

The surface of the annular part 50 on the opposite side to the valve 41 serves as a bearing surface for an annular pressure-relief valve 56 supported by springs 57 so as to shut off the holes 58 capable of connecting the passages 33 to the radial passages 59 provided in the bearing spacer 54. In this manner, the hydraulic liquid is able to pass from the upper portion 8a or the annular chamber 8b into the first chamber 2a of the cylinder by passing, in succession, through the passages 33, 54 and the holes 58 and being throttled by the pressure-relief valve 56.

A brief description now follows of the operation of the shock absorber when the rod 3 performs a compressive movement, i.e. a movement from the bottom upwards as viewed in FIG. 1. When such a relatively slow compressive movement is performed, the hydraulic liquid is able to pass from the first chamber 2a, the volume of which reduces, to the second chamber 2b via passages 28 and the flap valve 29 of the piston 1. The increase in pressure inside the chamber 2a gives rise to the formation of a damping force which rapidly increases with the compression speed of the rod.

When the rod performs a faster compressive movement, the pressure of the hydraulic fluid inside the first chamber 2a increases until the valve 41 is opened. The fluid leaving the first chamber 2a via the orifice 51 enters the intermediate space 48. When the compression speed of the rod is not yet too great, the liquid can still pass through the holes 55 in the flap valve 52 which has not yet opened. The liquid escapes via the radial passages 49 and the axial passages of the closing part 7. Some of the hydraulic liquid returns to the second chamber 2b, passing through the annular chamber 8b and the passages 30 in the lower closing part 5. The remainder of the hydraulic liquid corresponding to the increase in the immersed volume of the rod 3 inside the second chamber 2b is driven towards the reservoir 11, passing through the upper portion 8a and finally through the passages 23 and the nonreturn valve 24.

At a certain compression speed limit, the flap valve 52 is made to open, leaving a passage in the vicinity of its external periphery for the liquid leaving the first chamber 2a. The flap valve 52 therefore forms a restriction which the liquid leaving the first chamber 2a via the control valve 41 must pass through in order to rejoin either the second chamber 2b or the reservoir 11.

Owing to the abovementioned rigidity of the nonreturn valve 24, the pressure of the hydraulic liquid increases inside the intermediate space 48 as the liquid flowrate increases in the direction of the reservoir 11. This hydraulic pressure inside the intermediate space 48 acts on the flexible membrane 36 and causes the valve 41 to open against the force of the return spring 45 and of the reference pressure of the gas contained inside the chamber 34.

The pressure decreases inside the chamber 2a when the valve 41 opens, i.e. above a given compression speed; this results in a damping force which decreases when the compression speed exceeds the predetermined limit. The maximum value of the damping force depends on the prestressing of the spring 45 and the reference pressure of the gas contained inside the reference chamber 34, since it is partly the difference in pressure between this gas and the hydraulic liquid contained in the intermediate space 48 which determines the opening of the control valve 41 by causing a movement of the flexible membrane 36 and of the valve 41.

When very sudden compression of the shock absorber occurs, the elastic block 10 is compressed before there is even the slightest movement of the rod 3. This results in a reduction in the effective volume of the casing 8, thus causing an increase in the pressure inside the intermediate chamber 48 and opening of the valve 41.

As a result of the flap valve 52 forming a restriction which throttles the flow of liquid leaving the first chamber 2a, it is possible to prevent the damping force from decreasing to a practically zero value when the valve 41 opens and, instead, to keep it at a value which may be preferably equal to one third or one quarter of the maximum value of the damping force. Thus, improved traction of the vehicle wheels on the road surface is obtained, for example in the case where the surface has a succession of small periodic undulations.

It will be noted that the static component of the liquid pressure prevailing inside the intermediate space 48 is applied integrally to the flexible membrane 36 on account of the presence of the holes 40 in the deflector 39.

The deflector 39 channels, moreover, the flow of the liquid and thus makes it possible to prevent the operation of the control valve 41 from being disturbed by eddies causing local variations in pressure. For this purpose, the lower surface of the deflector 39 is advantageously shaped so as to define a slightly divergent passage for the liquid.

As has been seen, the flap valve 52 consists of a simple thin and flexible annular washer which is placed, by means of its external periphery on the component 54 forming part of the closing part 7. In the vicinity of its central bore, the flap valve 52 bears against the deflector 39 by means of the washer 53. By modifying the thickness of the washer 53 it is possible adapt the prestressing of the flap valve 52 and consequently the value of the damping force to very fast speeds.

When the rod 3 performs an expanding movement, the shock absorber operates in a conventional manner. The hydraulic liquid driven from the second chamber 2b is able to pass directly into the first chamber 2a via the passages 26 and the nonreturn valve 27 of the piston 1. The hydraulic liquid located inside the chamber 8b and inside the reservoir 11 is able to enter the first chamber 2a by passing through the axial passages 33 of the closing part 7. The liquid then enters the radial passages 59, the axial bores 58 and the pressure-relief valve 56.

Figure 4:
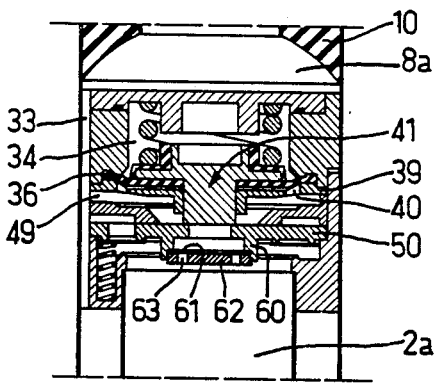
FIG. 4 is a partial view of a closing part of a shock absorber similar to that of FIG. 1, showing a variation in the arrangement of the flap valve according to the invention.

FIG. 4 shows a variant which differs solely from the preceeding embodiment in that the flap valve 52 is not mounted inside the intermediate space 48. In FIG. 4, identical parts have the same reference numbers. The annular part 50 has a flange 60 pointing towards the first chamber 2a. A flap valve 61, performing the same function as the flap valve 52 above, is mounted on this flange 60 and held secure by a nut 62 which has passages 63.

The operation of such a variant is identical to that of the variant shown in FIG. 1. When a very fast compressive movement is performed, causing the control valve 41 to open, the hydraulic liquid leaving the first chamber 2a is first of all throttled by the flap valve 61 which forms an additional restriction, thus making it possible to prevent the damping force from falling to a value close to zero when the valve 41 is open.

Figure 5:
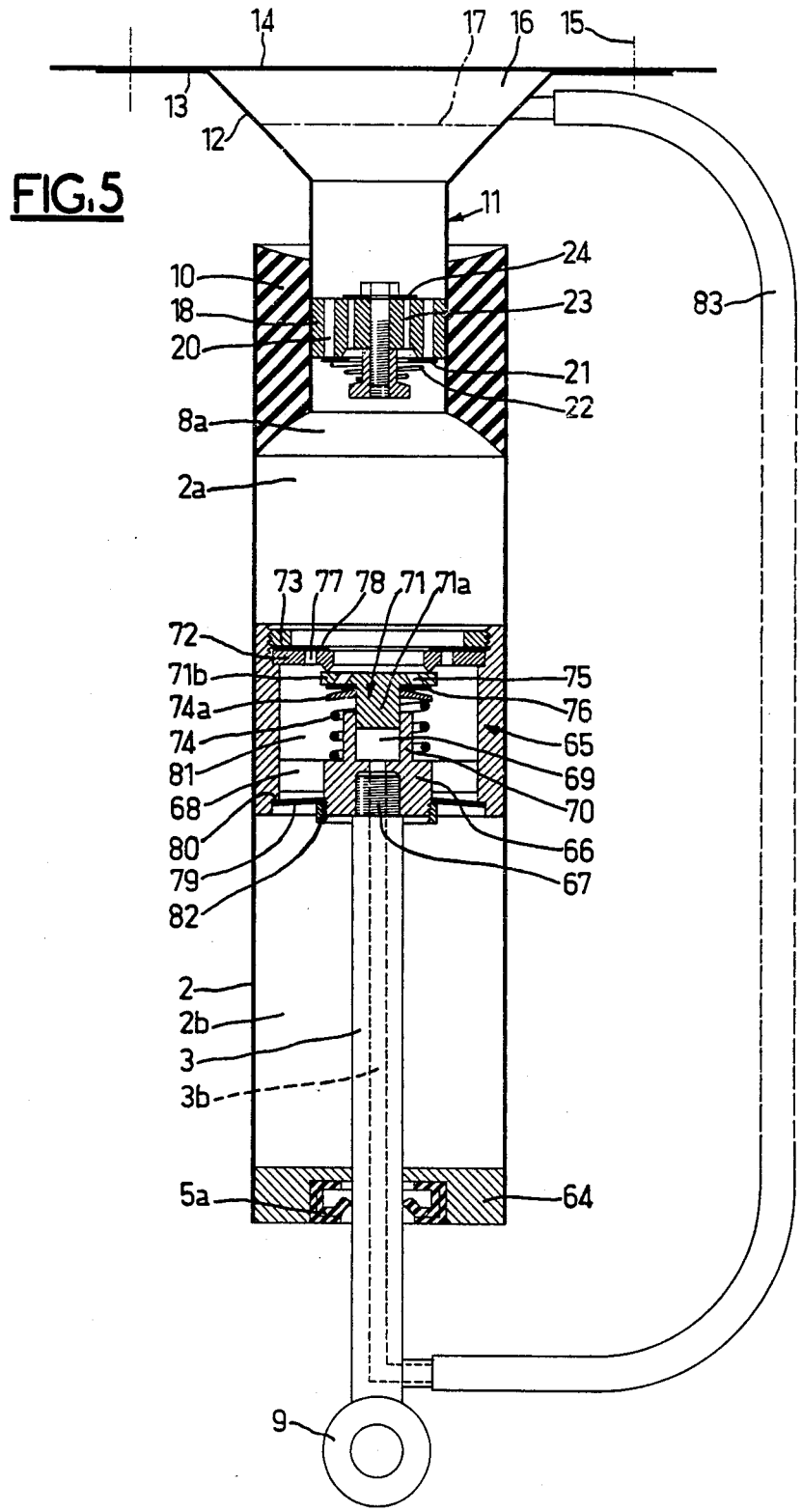
FIG. 5 is a sectional view, similar to FIG. 1, of a second embodiment of a shock absorber according to the invention in which the control valve is mounted inside the piston, the shock absorber having a single tube.

The embodiment illustrated in FIG. 5 differs mainly from the preceeding embodiments in that the shock absorber comprises a single tube consisting of the cylinder 2 itself and in that the control valve is mounted inside the piston of the shock absorber. Identical parts are indicated by the same reference numbers.

The lower end of the cylinder 2 is integral with a closing part 64 having a central bore provided with the sealing ring 5a through which the rod 3 of the piston passes.

The elastic block 10 is integral with the opposite end of the cylinder 2 and accommodates, as above, the reservoir 11.

The piston 65 is in the form of a hollow part having a central core 66 which is provided with an internal screw thread receiving the threaded end 67 of the rod 3 and is rigidly fixed to the side walls of the piston 65 by means of radial ribs 68, leaving between them a free passage for the hydraulic liquid. The central core 66 has, moreover, a recess acting as a reference chamber 69 and delimited laterally by an annular sleeve 70 integral with the core 66 of the piston. The reference chamber 69 is filled with a gas at a substantially constant pressure and is delimited, at its upper part, in a movable manner by the lower surface of the control valve 71 which is in the form of an auxiliary piston 71a which is able to slide in a sealed manner inside the recess 69. For this purpose, the control valve 71 has, in fact, a lower part 71a which slides inside the recess 69 and an upper disk 71b which has a larger diameter and which, by means of its upper surface, comes into sealing contact with a seat integral with a washer 72 fixed to the side walls of the piston 65 by a clamping ring 73.

The control valve 71 is pushed in its closing direction against the seat of the washer 72 by the action of a spring 74 which bears against a shoulder of the central core 66 of the piston 65, on the one hand, and against an annular collar 74a surrounding the lower part 71a of the control valve 71. The disk 71b of the control valve 71 has holes 75 which are inclined in relation to the axis of the device and cooperate with a nonreturn valve 76 held against the lower surface of the disk 71b by the collar 74a and the spring 74 so as to allow a limited amount of hydraulic liquid to pass between the first chamber 2a and the second chamber 2b. The washer 72 also has bores 77 cooperating with a nonreturn valve 78 held in position by means of clamping between the washer 72 of hydraulic liquid to pass from the second chamber 2b to the first chamber 2a.

A flap valve 79 forming an additional restriction is mounted in the vicinity of an end of the piston 65 opposite the control valve 71. The flap valve 79 consists of a thin, flexible, annular part, for example a sprung steel leaf. The flap valve 79 simply bears, by means of its external periphery, against a shoulder 80 provided on the side wall qf the piston 65 so as to allow a limited amount of liquid coming from the first chamber 2a to pass from the internal space 81 of the piston 65 in the direction of the second chamber 2b. The flap valve 79 also bears, by means of its central bore, against a nut 82 which is screwed onto the central core 66 of the piston 65. The fact that the internal periphery of the flap valve 79 simply rests against the shoulder formed by the nut 82 means that a limited amount of liquid is able to pass from the second chamber 2b into the internal space 81. The flap valve 79 is, therefore, able to operate in both directions by opening, alternately, in the vicinity of its external periphery or in the vicinity of its internal periphery.

The reference chamber 69 is, moreover, connected to the upper part 16 of the reservoir 11 by means of a flexible pipe 83 and by means of an axial bore 3b made along the entire length of the rod 3 and leading into the reference chamber 69. In this manner, any fluctuations in pressure due to temperature variations are no longer able to affect the operation of the shock absorber.

During operation of the shock absorber illustrated in FIG. 5, the control valve 71 is subjected to the action of four different forces:

the force of the spring 74 which tends to close the valve 71;

the pressure $p_1$, prevailing inside the chamber 2a, which acts on the surface S of the disk 71b of the control valve 71 in a direction which tends to open the said control valve;

the substantially constant pressure $p_4$ which acts on the surface and s of the auxiliary piston 71a and which tends to close the control valve 71;

and, finally, the pressure $p_2$ which acts on the remaining lower surface of the disk 71b or (S-s) and which tends to close the control valve 71.

In the case of slow compression speeds of the rod 3, the hydraulic liquid is able to pass from the chamber 2a to the chamber 2b passing through the drilled holes 75, the nonreturn valve 76 as well as the additional flap valve which opens in the vicinity of its external periphery.

When the compression speed of the rod exceeds a predetermined limit value corresponding also to a limit value of the pressure $p_1$ prevailing inside the first chamber 2a, the valve 71 opens leaving a much larger space for the liquid coming from the first chamber 2a to pass through. The liquid must still pass through the restriction consisting of the additional flap valve 79 so that the damping force does not decrease to a zero value, but remains at a value which depends on the rigidity of the flap valve 79 and which may be chosen so as to keep, for example, the minimum value of the damping force at about one third or one quarter of the maximum value of the damping force, before the control valve 71 opens.

It will be noted that the additional volume corresponding to the immersion of the rod 3 inside the cylinder 2 escapes towards the reservoir 11 via the passages 23 and by means of the restrictions defined by the nonreturn valve 24. The rigidity of the flap valve 24 is, therefore, an important factor in defining the characteristics of the shock absorber. It is in fact, the operating pressure of the control valve 71, i.e. the pressure prevailing inside the first chamber 2a when the control valve 71 is opened, which depends on the rigidity of this flap valve 24.

When the rod 3 performs a reverse movement, i.e. an expanding movement, the hydraulic liquid passes from the second chamber 2b into the first chamber 2a via the internal periphery of the additional flap valve 79 and the passages 77 defining restrictions in conjunction with the nonreturn valve 78. In a variant (not shown), the flap valve 78 and the passages 77 are eliminated, the pressure-relieving action of the flap valve 79 being considered sufficient. At the same time, a certain amount of liquid located inside the reservoir 11 passes through the passages 20 and restrictions formed by the nonreturn valve 21. It is advantageous to provide a nonreturn valve 21 with a relatively large degree of flexibility so as to obtain the best operating characteristics for an expanding movement.

When the shock absorber is compressed in an extremely sudden manner, the elastomer block 10 causes a reduction in the effective volume of the first chamber 2a before there is the slightest compressive movement of the rod 3, which causes an increase in the pressure $p_1$ prevailing inside the chamber 2a and, therefore, an immediate action on the control valve 71.

Figure 6:
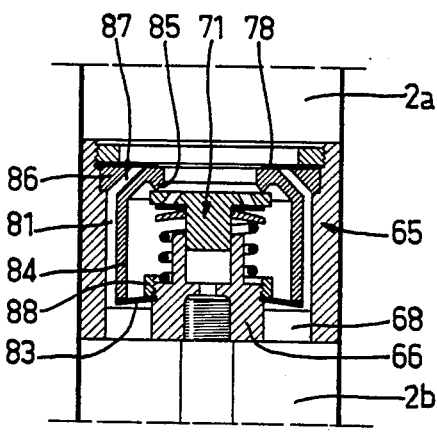
FIG. 6 is a partial sectional view of a piston which has been modified in relation to that shown in FIG. 5.
Figure 7:
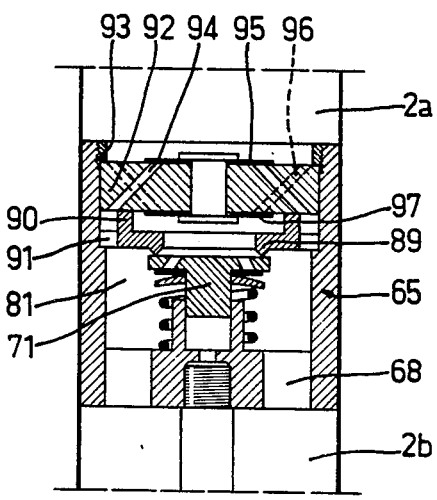
FIG. 7 is a view, in partial section, of a piston which has also been modified in relation to that shown in FIG. 5.
Figure 8:
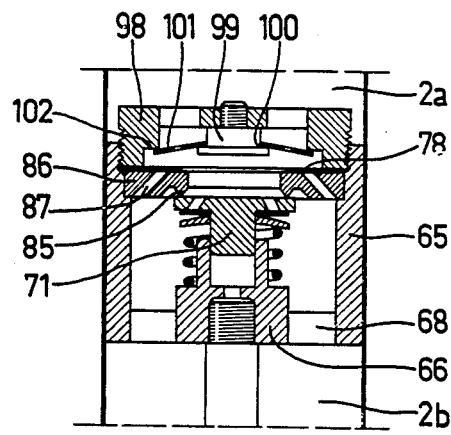
FIG. 8 is a view, in partial section, of another variation of FIG. 5.

The variants shown in FIG. 6, 7 and 8 show other possible arrangements of the additional flap valve 79. In these Figures, identical parts have the same reference numbers as in FIG. 5.

In FIG. 6, the flap valve 83 bears, by means of its external periphery, against the end of a sleeve 84, the opposite end of which serves as a bearing surface for the pressure-relief valve 78. The upper part of the sleeve 84 also defines the seat 85 of the control valve 71. The upper flange 86 of the sleeve 84 has inclined passages 87 which define, in conjunction with the flap valve 78, a restricted passage for the flow of the liquid from the second chamber 2b to the first chamber 2a, the fluid passing between the external surface of the sleeve 84 and the internal surface delimiting the space 81 of the piston 65. The flap valve 83 is fixed, by means of its bore, onto the central core 66, by being clamped with the nut 88.

When a rapid compressive movement is performed, the hydraulic liquid passing through the opening defined by the control valve 71 enters inside the sleeve 84 and is throttled by the flap valve 83 which opens in the vicinity of its external periphery. In this manner, as above, the damping force does not decrease to a zero value. When an expanding movement is performed, the liquid originating from the second chamber 2b passes through the passages 87 and the restrictions defined by the pressure-relief valve 78.

In the variant shown in FIG. 7, the annular washer 89 which defines the seat of the control valve 71 has a flange 90 and passages 91 in the vicinity of its external periphery which bears against a shoulder of the piston 65.

A closing part 92 is clamped inside the piston 65 between the flange 90 and a locking nut 93. The closing part 92 comprises inclined passages 94 cooperating with a nonreturn valve 95 on the side where the first chamber 2a is located. Passages 96 which are also inclined, but in the other direction, cooperate with a nonreturn valve 97 opposite the control valve 71.

In this embodiment, when a rapid compressive movement is performed, the hydraulic liquid passes first of all through the passages 96 and is throttled by the nonreturn valve 97 before passing through the control valve 71 which opens. As above, owing to the existence of the additional restriction defined by the passages 96 and the flap valve 97, it is possible to obtain a damping force which does not decrease to a zero value, even when an extremely rapid compressive movement occurs.

When an expanding movement occurs, the liquid originating from the chamber 2b and located inside the internal space 81 of the piston 65 passes through the holes 91 and then the passages 94, before being throttled by the flap valve 95 and entering the chamber 2a.

In the variant shown in FIG. 8, which is related to the variant shown in FIG. 6, a part 98 is screwed onto the end of the piston 65, thereby clamping the non-return valve 78. The part 98 enables a central hub 99 provided with a peripheral edge 100 to be fixed. A flap valve 101, consisting of a simple disk, bears, by means of its bore, against the edge 100 and, by means of its periphery, against a step 102 in the part 98.

The flap valve 101 is thus able to open inwards when an expanding movement is performed and outwards when a compressive movement occurs. Apart from the arrangement of the flap valve 101 forming an additional restriction between the first chamber 2a and the seat of the valve 71, this variant operates, therefore, in the same manner as that illustrated in FIG. 6.

Figure 9:
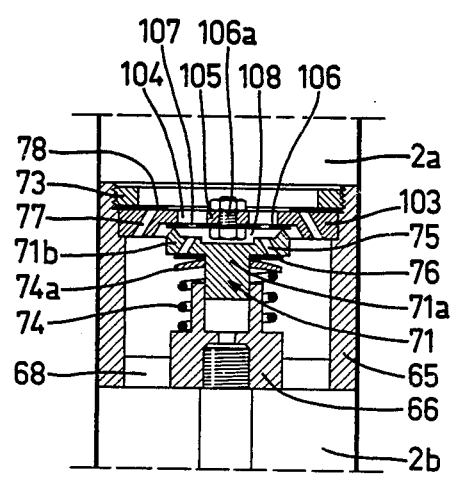
FIG. 9 is a view, in partial section, of another variation of FIG. 5.

In the variant shown in FIG. 9, in which the parts similar to those in FIG. 5 have the same reference numbers, the flange 103 has drilled holes 104 in its middle zone and a central part 105 enabling a flap valve 106 to be fixed by means of a screw 105a. The flap valve 106 which closes off the space 2a is kept pressed, on its periphery, against the portion of the flange 103 which forms the seat of the control valve 71, by the double effect of the force exerted by the control valve 71 and by the prestressing of the flap valve 106 owing to its central fixture.

As a result of the small orifices 107 provided in the flap valve 106, at slow compression speeds, a small amount of oil is able to escape via the channels 75 defining a restricted flow passage on account of the flap valve 76, as was the case in the embodiment shown in FIG. 5.

Operation is comparable to that obtained in the case of the other variants. Where there is a fast compression speed with the control valve 71 open, the fluid driven from the space 2a towards the space 2b makes use of the drilled holes 104 and is throttled between the periphery of the flap valve 106 and the periphery flange 103 forming a seat, thus creating a damping force which is small but greater than zero.

The main advantage of this assembly compared to that of the other embodiments lies in the fact that, when the control valve 71 is closed, since the space 108 between the flap valve 106 and the valve 71 is very small, the oil expelled as a result of the control valve 71 being closed brakes this movement of the valve 71 and, consequently, closing of the control valve 71 is particularly silent.

Such an arrangement is also conceivable in the case of the variant illustrated in FIGS. 1 and 2. The flap valve corresponding to the flap valve 106 in FIG. 9 is, in this case, fixed to the part 50 and compressed by the control valve 41. However, in view of the smaller diameter of the control valve 41 in the embodiment shown in FIGS. 1 and 2, this arrangement is less suitable here than in the case of the variant illustrated in FIG. 9.

I claim:

1. Shock absorber for the suspension of a motor vehicle, said shock absorber comprising:
   a cylinder containing hydraulic fluid,
   a piston, connected to a rod, for defining a first chamber and a second chamber within the cylinder with the second chamber containing the rod;
   means defining a hydraulic fluid reservoir;
   a first flow restriction means for permitting restricted hydraulic fluid flow communication between the first chamber and the reservoir;
   a control valve, movable under pressure of the hydraulic fluid in the first chamber from a closed position to an open position during a rapid compression movement of the piston, for providing a controlled fluid flow path through the valve and between the first chamber and the second chamber when the valve is opened;
   means defining a reference chamber for containing a reference gas therein, the chamber having therein one wall that is movable with the control valve;
   a biasing spring positioned to bias the control valve, the hydraulic fluid in the first chamber having a pressure tending to bias the control valve open, the reference fluid pressure and the spring tending the bias the control valve closed;
   a second flow restriction means for providing a predetermined damping force; and
   means for fixing the second flow restriction means in a position proximal to the control valve in said controlled fluid flow path, the second restriction means restricting fluid flow in said controlled fluid flow path to provide the predetermined damping force.

2. Shock absorber as claimed in claim 1, wherein the second flow restriction means is positioned downstream of the seat of the control valve in said fluid flow path.

3. Shock absorber as claimed in claim 1, wherein the second flow restriction means is positioned between the first chamber and the seat of the control valve.

4. Shock absorber as claimed in claims 1, 2 or 3, wherein the second flow restriction means consists of a flap valve formed by a thin annular disk provided with a central bore and simply resting, in one direction, by means of its external periphery and, in the other direction, by means of the internal periphery of the central bore.

5. Shock absorber as calimed in claim 1, wherein the pressure of the reference gas is greater than atmospheric pressure.

6. Shock absorber as claimed in claim 1, comprising an elastic block by means of which the shock absorber is fixed, the elastic being fixed inside the shock absorber so as to give rise to a reduction in the effective volume of the shock absorber, thereby causing the control valve to open during a sudden compressive movement of the piston.

7. Shock absorber as claimed in claim 1, wherein the second flow restriction means comprises a flap valve, the control valve is mounted inside the piston consisting of a hollow part, and the flap valve is mounted in the vicinity of one of the ends of the piston.

8. Shock absorber as claimed in claim 7, wherein the piston comprises the second flow restriction means, the second flow restriction means allowing hydraulic fluid to flow from the second chamber towards the first chamber when the rod performs an expanding movement.

9. Shock absorber as claimed in claim 7, wherein the flap valve bears, by means of its external periphery, agaisnt an end of a sleeve, the opposite end of the sleeve serving as a bearing surface for a pressure-relief valve, the sleeve having an upper part defining the seat of the control vale, the sleeve having a n upper flange with inclined passages therein, the inclined passages defining in conjunction with the flap a restricted passage for the flow of liquid from the second chamber to the first chamber whereby the fluid passes between an external surface of the sleeve and a space between the piston and the cylinder.

10. Shock absorber as claimed in claim 1, wherein the second flow restriction means comprises a flap valve, the control valve is mounted inside the piston consisting of a hollow part and the flap valve is mounted in the seat of the conrol valve which compresses the flap valve when it performs its closing movement.

11. Shock absorber as claimed in claim 1, further comprising means for providing another fluid flow path enabling fluid flow from the first chamber to the second chamber during compression movements of the piston and a third flow restriction means located in said other fluid flow path for providing another damping force by restricting fluid flow in said other flow path.

12. Shock absorber as claimed in claim 1, further comprising an elastic membrane integral with the control valve for delimiting the movable wall of the reference chamber.

13. Shock absorber as claimed in claim 1, further comprising means for providing another fluid flow path enabling fluid flow from the first chamber to the seocnd chamber during compression movements of the piston and a third flow restriction means located in said other fluid flow path for providing another damping force by restricting fluid flow in said other flow path.

14. Shock absorber for the suspension of a motor vehicle, said shock absorber comprising: a cylinder containing hydraulic fluid; a piston connected to a rod, the piston for providing a predetermined damping force; and means for fixing the second flow restriction means in a position proximal to the control valve in said controlled fluid flow path, the second restriction means restricting the fluid flow in said controlled fluid flow path when the control valve is pressured open to provide the predetermined damping force.

15. Shock absorber as claimed in claim 14, further comprising a fixed closing part and a deflector member, the closing part closing an end of the cylinder, the closing part defining an intermediate space therein, the control valve and the deflector member being mounted in the intermediate space, the deflector member consisting of an annular disk provided with holes in the vicinity of its outer periphery and occupying radially the entire intermediate space.

16. Shock absorber as claimed in claim 15, wherein the deflector member is fixed, by means of its external periphery, to the closing part and the deflector member has a central sleeve for guiding the control valve.

17. Shock absorber as claimed in claim 14, further comprising an elastic membrane integral with the control valve for delimiting the movable wall of the reference chamber.

18. Shock absorber for the suspension of a motor vehicle, said shock absorber comprising:
a cylinder containng hydraulic fluid;
a piston connected to a rod, the piston defining a first chamber and a second chamber within the cylinder, the second chamber containing the rod;
means defining a hydraulic fluid reservoir;
a first flow restriction means for permitting restricted hydraulic fluid flow communication between the first chamber and the reservoir;
a control valve for controlling a fluid flow between the first chamber and the second chamber;
means defining a reference chamber for containing a reference gas under pressure therein, and having therein one wall that is movable with the control valve;
a biasing spring positioned to bias the control valve, the hydraulic fluid in the first chamber having a pressure tending to bias the control valve open, the reference gas pressure and the spring tending to bias the control valve closed;
a second flow restriction means positioned in the flow path of the hydraulic fluid exiting the first chamber for restricting the flow of the liquid from the first chamber when a rapid compression movement of the piston causes the control valve to open, the second flow restriction means consisting of a flap valve formed by a thin annular disk having a central bore and simply resting, in one direction, by means of its external periphery and, in the other direction, by means of the internal periphery of the central bore;
a cylindrical casing which surrounds the cylindner inside which the piston moves and defines, together with the cylinder, an annular chamber able to connect the first chamber to the second chamber;
a fixed closing part defining an intermediate space wherein the control valve is mounted, the flap valve separating the intermediate space into a first area delimited by a flexible membrane integral with the control valve and a second area delimited by a seat of the control valve, the second area communication with the first area through the flap valve, the first area being in communication with the reservoir through a passage in the fixed closing part and the annular chamber; and a deflector member being mounted inside the first area of the intermediate space, the deflector member being capable of channeling the flow of liquid when the control valve is opened by reducing effects of dynamic pressure on the flexible membrane.

19. Shock absorber as claimed in claim 18, wherein the deflector member consists of an annular disk which is provided with holes in the vicinity of its external periphery and occupies radially the entire internal space.

20. Shock absorber as claimed in claim 19, wherein the deflector member is fixed, by means of its external periphery, to the closing part and has a central sleeve for guiding the control valve.

21. Shock absorber for the suspension of a motor vehicle, said shock absorber comprising;

a cylinder containing hydraulic fluid, a piston connected to a rod, the piston defining a first chamber and a second chamber within the cylinder, the second chamber containing the rod;

means defining a hydraulic fluid reservoir;

a first flow restriction means for permitting restricted hydraulic fluid flow communication between the first chamber and the reservoir;

a control valve having a seat for controlling a hydraulic fluid flow between the first chamber and the second chamber;

means defining a reference chamber for containing a reference gas under pressure therein, the chamber having therein one wall that is movable with the control valve;

a biasing spring positioned to bias the control valve, the hydraulic fluid in the first chamber having a pressure tending to bias the control valve open, the reference gas pressure and the spring tending to bias the control valve closed;

a second flow restriction means for restricting the flow of the fluid from the first chamber through the valve to the second chamber when a rapid compression movement of the piston causes the control valve to open;

a cylindrical casing which surrounds the cylinder inside which the piston moves and defines, together with the cylinder, an annular chamber capable of connecting the first chamber to the second chamber;

a fixed closing part defining an intermediate space wherein the control valve is mounted and having a passage for connecting the annular chamber to the reservoir through a third fluid flow restriction means, the intermediate space communicating with the second chamber through the annular chamber, and a deflector member, mounted inside the intermediate space, for channeling fluid flow when the control valve is opened by reducing effects of dynamic pressure on the flexible membrane.

22. Shock absorber as claimed in claim 21, wherein the deflector member consists of an annular disk provided with holes in the vicinity of its external periphery and which occupies radially the entire internal space.

23. Shock absorber as claimed in claim 22, wherein the deflector member is fixed by means of its external periphery to the closing part and the deflector member has a central sleeve for guiding the control valve.

* * * * *